United States Patent Office 3,506,447
Patented Apr. 14, 1970

3,506,447
METHOD FOR PREPARING A FRUIT CEREAL PRODUCT
Fred W. Billerbeck, Francisco S. Hing, and Vincent J. Kelly, Fremont, Mich., assignors to Gerber Products Company, Fremont, Mich.
No Drawing. Filed July 21, 1965, Ser. No. 473,832
Int. Cl. A23l 1/10
U.S. Cl. 99—83                                  8 Claims

ABSTRACT OF THE DISCLOSURE

A process for obtaining a dehydrated reconstitutable fruit-cereal by incorporating an ester-containing organic releasing agent in a fruit/cereal slurry prior to dehydration of the slurry on a drying surface.

---

This invention relates to the preparation of a pre-cooked, dehydrated, fruit-cereal product that is rapidly reconstitutable with liquid to form a homogeneous smooth textured fruit-cereal mass suitable for infant feeding and which has the distinctive flavor of natural fruit.

The new product is made with the addition of certain release agents to the starting fruit-cereal slurry prior to its dehydration so that the dried slurry is readily and substantially completely removable from the drying surface employed. Ready release avoids overcooking and adds to the unique natural fruit flavor of the product. It also simplifies practical commercial problems of removing the dried slurry on a continuous basis without equipment shut-down due to adhesion of slurry on the dryer.

In essence, the invention contemplates formation of a slurry containing substantial quantities of both fruit puree and cereal flour. An effective amount of an ester-emulsifier derived from a fatty acid or alcohol is incorporated in the slurry to create the desired release properties. The release agents are esters of the type noted and have heretofore been known and used for their emulsification properties. The present invention is based upon the discovery that this special group of emulsifiers (as distinguished from all other types of emulsifiers which do not aid in the present context) will facilitate release and enhance flavor of dried fruit-cereal sheets.

Pre-cooked, dried products, which lend themselves to easy reconstitution or rehydration to yield a smooth, fluffy textured, edible mass when mixed with a liquid such as milk or water, have found increasing use in the feeding of infants and adults who require geriatric or post-operative care. Dehydrated products of this general type are available to the consumer in the form of cereals and fruits. These dehydrated products can be produced by preparing a paste or thick suspension, i.e. a slurry or puree, obtained by heating the raw materials to form a pulp which may be strained or sieved to ensure uniform particle size. The slurry or puree is then applied to the surface of conventional drying equipment such as a drum dryer, where substantially all (90–98%) of the water contained therein is removed. The dried product is conveniently flaked and packaged for use.

When the dehydrated puree is prepared from a cereal, it is easily removed from the drying surface by scraping with doctor blades. However, when the sugar content of the slurry is appreciably higher, for example, when a puree is prepared from fruit, the puree dehydrates to a sticky, plastic sheet which is difficult to remove from the drying surface. In the case of a fruit puree, it is necessary not only to employ scrapers to remove the dehydrated product from the dryer, but also to utilize draw-off rollers or tension devices to prevent product build-up at the scraper blades, to ensure that the dehydrated product will not be retained on the drying surface where its flavor and ability to reconstitute would be diminished by excessive drying or heating. Equipment of this nature is exemplified by U.S. Patent No. 2,352,195.

Similar difficulties, which result in loss of production, have been encountered even when only a portion of the puree is prepared from fruit, e.g. when up to half the puree is formed from a cereal composition.

It has now been found that when certain ester-containing additives are included in the fruit-cereal puree compositions, conventional dehydration techniques produce a dried product which is neither sticky nor difficult to remove from the drying surface. Simple drum dryers, which merely employ standard scraping devices without tension rollers or the like for sheet removal, can now be utilized for the drying of fruit-cereal purees and the desired continuous sheet obtained.

The organic additives, hereinafter referred to as "releasing agents," which have been found to minimize, in some unknown manner, the heretofore detrimental effect that a high sugar content has on certain physical properties of fruit-cereal slurries, are those which contain at least one ester linkage

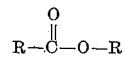

an ester linkage resulting from the condensation reaction of an organic acid and an organic alcohol. The esters are derived from fatty acids or alcohols and therefore contain a long hydrocarbon chain. In addition, the esters are commonly identified as "emulsifiers" and have the requisite chemical structure although they do not necessarily function as emulsifiers in the present environment. These releasing agents by their mere presence in the puree composition, unexpectedly assist in the release of such compositions, when dehydrated, from a heated drying surface.

The esters which form an integral portion of the releasing agents of this invention are prepared from acids, such as saturated and unsaturated monobasic acids of from 4 to 26 carbon atoms, preferably from 14 to 18 carbon atoms; dibasic acids of from 2 to 10 carbon atoms, preferably from 3 to 7 carbon atoms; and the salts thereof.

Examples of typical monobasic acids employed as starting materials for the esters of this invention include: stearic acid, palmitic acid, oleic acid, lignoceric acid, nervonic acid, myristic acid, arachidic acid, behenic acid, ricinoleic acid and the like. Examples of preferred monobasic acids are linoleic, arachidic, palmitic, stearic, myristic and oleic acids. Examples of dibasic acids advantageous herein include: malonic acid, succinic acid, glutaric acid, adipic acid, pimelic acid and the like.

The types of alcohols which, when reacted with the above-mentioned acids, result in edible esters effective for the purposes of this invention, include saturated and unsaturated monohydric alcohols of from 12 to 26 carbon atoms, preferably 14 to 18 carbon atoms; and saturated and unsaturated polyhydric alcohols of from 2 to 10 carbon atoms, preferably of from 4 to 8 carbon atoms.

Illustrative of monohydric alcohols suitable as starting materials for the esters of this invention are myristyl alcohol, cetyl alcohol, stearyl alcohol and the like. Dihydric alcohols advantageous for this invention include ethylene glycol and the like, while trihydric alcohols include glycerol, sorbitol and the like.

As mentioned, in addition to the fatty hydrocarbon chain which is obtained with the above compounds, the ester molecule will also elsewhere contain an oxygenated polar group such as a hydroxyl group, a carboxylic acid salt radical, or a phosphatide linkage by reason of which the ester exhibits emulsification properties under other circumstances.

More specifically, phosphatides, a group of complex lipids containing a phosphoric acid grouping and a nitrogenous base, in addition to other acid components, have been found to be especially desirable. A preferred ester of this group has been found to be lecithin, a mixture of the diglycerides of stearic, palmitic and oleic acids linked to the chloine ester of phosphoric acid.

The ester-containing releasing agents of this invention may be employed in quantities up to 5% by weight, based on the initial fruit-cereal composition, but have been found to be advantageous in amounts as small as 0.01%, by weight. When employed in concentrations from about 0.1 to about 1.0% by weight, these releasing agents have been found to be especially effective in assisting in the production of a dehydrated puree which, not only releases easily from the drying surface, but also results in a reconstitutable product which has a true and desirable fruit flavor.

The cereal-fruit compositions of this invention may include, in addition to fruit, cereal and edible organic emulsifier, certain quantities of sugar, vegetable oil, and milk. In addition, various acids, vitamins, and other miscellaneous ingredients may be employed as desired to create an optimum product.

The aforementioned quantities of releasing agent are generally effective when the amount of fruit employed is from about 30–60% by weight of total composition of the slurry. Such a quantity of fruit will usually have a solids content of from about 15 to about 25% by weight. Of course, variations in the amount of fruit puree employed are possible especially because of variations in the solids content thereof. Such variations will also depend, for instance, on the type of fruit employed and the strength of the product fruit flavor desired. The term "fruit" is meant to include any naturally occurring fruit such as banana, apricot, pineapple, prune, cherry and the like and mixtures thereof.

Any cereal grain flour normally employed in this art, e.g., oat, wheat, rice, corn, barley and the like and mixtures thereof, may be included herein. It is advantageous to employ about 20–40% of flour by weight of total composition of the slurry.

Sugar, preferably granulated white sugar, may be added in amounts up to 25% to assist in bringing out the natural fruit flavor. From 5 to 15% has been found to be desirable.

The use of fluid milk, and preferably whole milk or non-fat dry milk powder in amounts up to 25%, and particularly from about 5 to about 15%, by weight of the slurry, can also be employed to significantly improve and enhance the natural fruit flavor of the product.

Vegetable oils, such as soya oil and the like, may also be desirable ingredients when employed in amounts of about 1 to 3% by weight of the slurry. The vegetable oil aids in release of the dried sheet, improves the general character of the sheet, and results in a more desirable flake.

Various food acids, e.g. citric acid, fumaric acid, malic acid and the like may be employed in amounts from 0.1 to 8% and preferably about 0.5 to 3.0%, by weight, to adjust the pH to about 3.5 to 5.5, preferably 4.5 to 5.0, this range having been found most effective for enhancing the natural fruit flavor when the product is reconstituted.

The object of dehydrating is to remove as much of the water present in the puree as possible without detrimentally effecting its quality. Therefore, the final products envisioned by this invention usually contains at least 90% solids and preferably from 95 to 98% solids.

The novel reconstitutable fruit-cereal puree of this invention can be prepared by any of the conventional methods, well known to those of skill in the art. For example, a slurry can be prepared by mixing cereal grain flour, fresh ripened fruit, granulated white sugar, milk (or milk concentrate) vegetable oil and the ester-containing releasing agent along with any other ingredients, such as minerals or vitamins which may be deemed desirable; and sufficient water so that the solids content of the resulting slurry will be from about 15 to 30% by weight and preferably about 25%. It will be recognized that the solid concentration of the slurry will control the characteristics and properties of the resulting dehydrated product, as well as controlling the amount of water which necessarily must be removed in the drying operation.

The slurry is then passed through a screen to produce a puree of uniform consistency. Conventional screening devices with openings of about 0.033 inch are frequently employed.

Subsequent heating of the slurry to 140 to 230° F., and preferably 190 to 205° F., in conventional equipment such as atmospheric, vacuum, pressure-cooking tanks or in-line agitating heaters, produces a gelatinized puree suitable for dehydration.

Next, drying is accomplished, not only to remove a substantial portion of the water contained in the puree, but to complete the cooking process. Drying means include, e.g. any of the conventional equipment readily available, such as single or double drum dryers well known in this art. The dehydrated puree is most easily removed from the drying surface as a continuous sheet, preferably having a thickness of 4–7 mils, and without sticking, balling or lumping with, e.g. a conventional doctor blade.

When using such drum dryers, the film thickness will obviously be dependent on the spacing between the drums, the drum speed, the type of puree being treated and the steam pressure in the drums. The steam pressure can be advantageously employed in the range of 30 to 90 p.s.i.g. It has been found that an optimum product is obtained when the drying means, especially double drum dryers, are run at high drum temperature and drum pressure. However, none of these factors will deter the effectiveness with which the ester-containing releasing agents of this invention enhance the release of the dried sheet from the drying surface.

The dried fruit-cereal sheet may be prepared for packaging and ultimate consumption by flaking into various sizes depending, of course, on the rehydration characteristics of the particular fruit-cereal puree being treated. Here again, the flaking is accomplished in standard equipment such as a 10 mesh U.S. sieve series screen (0.030" wire). However, when the particle size of the finished product is too fine, the particles may tend to lump and therefore be difficult to rehydrate.

Although this invention negates the necessity of tension or draw-off rollers, it is within the skill of this art to employ such devices if desired.

To further illustrate the novel process of the invention, the following examples are provided. It should be understood that the details thereof are not to be regarded as limitations as they may be varied as will be understood by one skilled in this art. The percentages included

EXAMPLE I

Oat cereal with banana

A fruit-cereal slurry was prepared in approximately the following proportions:

| Ingredients: | Quantity, per- cent by weight |
|---|---|
| Banana puree [1] (total solids, 23%) | 50 |
| Oat flour | 31 |
| Granulated white sugar | 10 |
| Skim milk powder | 6.4 |
| Lecitreme 40 [2] | .6 |
| Vitamins, seasoning, acid, etc. | 2.0 |
| | 100.0 |

[1] The banana puree was prepared from fully ripened frozen, bananas by riving frozen bananas through a riving machine and finishing through a 0.033 inch screen.
[2] Lecitreme 40, a product of the Beatrice Foods Company, is a powdered product containing 40% crude double bleached lecithin.

Sufficient water was added to reduce the overall solids content to about 22.6%.

The slurry, having a pH of about 5.0, was pumped through a line strainer having a screen size of 0.060 inch to a holding tank at a temperature of about 160°–180° F., from where it was transferred to an agitating heater at about 205° F. The heated slurry was then fed to a conventional double drum dryer, each drum operating at an internal pressure of 80 p.s.i.g. The drums were rotated at 3 revolutions per minute and the dried-sheet removed with doctor blades. The resulting sheet was non-plastic, continuous and had a film thickness of about 5 mils. The doctor blades were loosely held to the drums, yet the sheet was readily removed. Once equilibrium of operation was established, no losses of dried puree were incurred on the dryer surface.

The resulting dried fruit-cereal sheet was continuously conveyed to a flaker employing a No. 5 (U.S. Standard) screen size. The resulting flaked product had a moisture content of 2%. The dried product was stored overnight, then reconstituted with about five times its weight in water and a smooth textured fruit cereal with a distinctive natural banana flavor was obtained.

EXAMPLE II

Variations in fruit puree

Example I was repeated, replacing the banana puree with (a) apricot, (b) pineapple prepared by grinding canned crushed pineapple through a Fitzmill with an 0.031 inch screen, and (c) prune prepared by steaming dried prune in a screw steamer at 210° F. for 20 minutes and finishing the steamed prune through a ⅛ inch screen to remove the seeds and then through a 0.33 inch screen.

EXAMPLE III

Variations in flour

Example I was prepared, replacing the oat flour with (a) rice flour, (b) wheat flour, and (c) a mixture of oat, whole wheat, corn and barley flour in the ratio of 2:1:1:1.

EXAMPLE IV

Variations in the ester-containing organic releasing agents

Example I was repeated, replacing the Lecitreme 40 with (a) Pruv, a sodium stearyl fumarate, prepared from the disodium salt of succinic acid and stearyl alcohol, a product of Chas. Pfizer and Co., Inc. (b) Marvic acid, a lactylic stearate manufactured by Durkee Famous Foods; (c) Myverol type 18–07, a glycerol ester of stearic acid, a product of Distillation Products Industries; (d) Tween 80, the sorbitol ester of oleic acid, further reacted with ethylene oxide, and manufactured by The Atlas Powder Co.; (e) Stal-Sol (a lecithin concentrate), manufactured by the A. E. Staley Manufacturing Co.; and (f) Clearate In (contains lecithin), a product of the W. A. Clearly Corporation.

Each of the purees described in Examples II–IV were easily removed from the drying surface and when reconstituted yielded a smooth textured cereal with a distinctive fruit flavor.

Although the foregoing invention has been described in some detail by way of illustration and example for purposes of clarity and understanding, it is understood that certain changes and modifications may be practiced within the spirit of the invention.

What is claimed is:

1. A process for preparing a pre-cooked, dried fruit-cereal product that is easily removable from a heated drying surface and capable of being readily reconstituted by hydration comprising: preparing a fruit puree-cereal flour slurry containing about .01–5.0% by weight of an ester-containing organic releasing agent, wherein the ester is the reaction product of an acid selected from the group consisting of saturated and unsaturated monobasic fatty acids of from 4–26 carbon atoms, dibasic acids of from 2–10 carbon atoms, and the salts thereof, and an alcohol selected from the group consisting of saturated and unsaturated monohydric alcohols of from 12–26 carbon atoms, and saturated and unsaturated polyhydric alcohols of from 2–10 carbon atoms; dehydrating said slurry on a drying surface; and removing the resulting dehydrated product from said drying surface.

2. A process for preparing a dehydrated reconstitutable fruit-cereal comprising: preparing a slurry having substantial quantities of fruit puree and cereal flour and a releasing agent comprising an ester having at least one fatty hydrocarbon chain and an oxygenated polar group linked to another portion of the ester molecule in an amount of about .1–1.0 parts by weight of the slurry, dehydrating the slurry on a drum drier, and removing the dehydrated slurry from said drum drier.

3. In the process for preparing a dehydrated reconstitutable fruit-cereal product from a slurry having substantial quantities of fruit puree and cereal flour, the improvement comprising incorporating in said slurry a sufficient amount of an ester-emulsifier releasing agent derived from a member of the group consisting of fatty acids and fatty alcohols in an amount sufficient to significantly facilitate the release of said slurry from the surface of a drum drier after being dried thereon.

4. A process for preparing a dehydrated reconstitutable fruit-cereal product comprising: preparing a slurry with, in parts by weight, about 30–60 of fruit puree (approximately 15–25% solids), about 20–40 of cereal grain flour, about 5–25 milk solids, and about .1–1.0 of an ester-emulsifier releasing agent derived from a member of the group consisting of fatty acids and fatty alcohols, dehydrating said slurry on a drum drier, and removing the dehydrated slurry from said drier.

5. A process in accordance with claim 4 wherein said ester-emulsifier is a phosphatide.

6. A process in accordance with claim 5 wherein said phosphatide is lecithin.

7. A process for preparing a dehydrated reconstitutable fruit-cereal product comprising: preparing a slurry containing, in parts by weight, about 30–60 fruit puree (approximately 15–25% solids), about 20–40 cereal grain flour, about 5–15 non-fat dry milk powder, about 5–15 sugar, about 1–3 vegetable oil, and about .1–1.0 of an ester-emulsifier releasing agent dervied from a member of the group consisting of fatty acids and fatty alcohols, adjusting the total solids of the slurry with water to about 15–30% by weight, adjusting the pH of the slurry with a food acid to about 3.5–5.5, dehydrating the slurry on a drum drier, and removing the dried slurry from said drum drier.

8. A process in accordance with claim 7 wherein said ester-emulsifier is lecithin.

References Cited

UNITED STATES PATENTS

| | | | |
|---|---|---|---|
| 1,990,329 | 2/1935 | Johnson et al. | 99—83 X |
| 2,980,543 | 4/1961 | Hale et al. | 99—207 |
| 3,113,869 | 10/1963 | Lee | 99—85 |
| 3,228,454 | 1/1966 | Kett | 99—199 X |

OTHER REFERENCES

Eskew et al., "Potato Flakes V—Potato Flakes of Increased Density," ARS 73–30, U.S.D.A., September 1960, 20 pp., p. 12 relied upon.

RAYMOND N. JONES, Primary Examiner

U.S. Cl. X.R.

99—199